United States Patent [19]

Maeda

[11] Patent Number: 5,402,403
[45] Date of Patent: Mar. 28, 1995

[54] DEVICE FOR DETECTING CROSS TALK LEVEL OF OPTICALLY READ SIGNAL

[75] Inventor: Takanori Maeda, Tokorozawa, Japan

[73] Assignee: Pioneer Electronic Corporation, Tokyo, Japan

[21] Appl. No.: 77,948

[22] Filed: Jun. 18, 1993

Related U.S. Application Data

[63] Continuation of Ser. No. 513,738, Apr. 24, 1990, abandoned.

[30] Foreign Application Priority Data

May 10, 1989 [JP] Japan .................................. 1-116989

[51] Int. Cl.$^6$ .............................................. G11B 7/00
[52] U.S. Cl. ............................... 369/44.32; 369/44.25; 369/48; 369/58
[58] Field of Search ............... 369/44.32, 32, 43, 49, 369/48, 50, 44.25, 44.28, 271.1, 44.26, 278, 54, 58; 360/77.15, 77.14; 358/328, 340

[56] References Cited

U.S. PATENT DOCUMENTS

| | | | |
|---|---|---|---|
| 4,141,047 | 2/1979 | Kambara et al. | 360/77.14 |
| 4,665,442 | 5/1987 | Kanamara | 369/44.32 |
| 4,682,314 | 7/1987 | Nakagaki et al. | 369/44.32 |
| 4,697,257 | 9/1987 | Sugiyama | 369/43 |
| 4,712,204 | 12/1987 | Takemuza et al. | 369/32 |
| 4,748,610 | 5/1988 | Nakata et al. | 369/44.32 |
| 4,817,069 | 3/1989 | Shigemori | 369/43 |
| 4,817,077 | 3/1989 | Ono | 369/44.32 |
| 4,907,102 | 3/1990 | Tsunoda et al. | 360/48 |
| 4,977,469 | 12/1990 | Yokozawa | 369/43 |
| 5,003,414 | 3/1991 | Yokozawa | 360/77.15 |
| 5,166,914 | 11/1992 | Shimada et al. | 369/44.26 |

Primary Examiner—Georgia Y. Epps
Assistant Examiner—Nabil Hindi
Attorney, Agent, or Firm—Sughrue, Mion, Zinn, Macpeak & Seas

[57] ABSTRACT

A crosstalk level detector has a processing circuit for determining the level of crosstalk of a signal read by an information reproducing system from an information storage medium with information recorded in its tracks. The processing circuit compares levels of reference signal components contained in the read signal and produced from adjacent signal tracks at positions aligned in a direction normal to the tracks, and calculates the crosstalk level based on the compared levels. The reference signal components may be derived from a signal recorded in the information stored medium, such as a horizontal synchronizing signal recorded in an optical video disk.

10 Claims, 3 Drawing Sheets

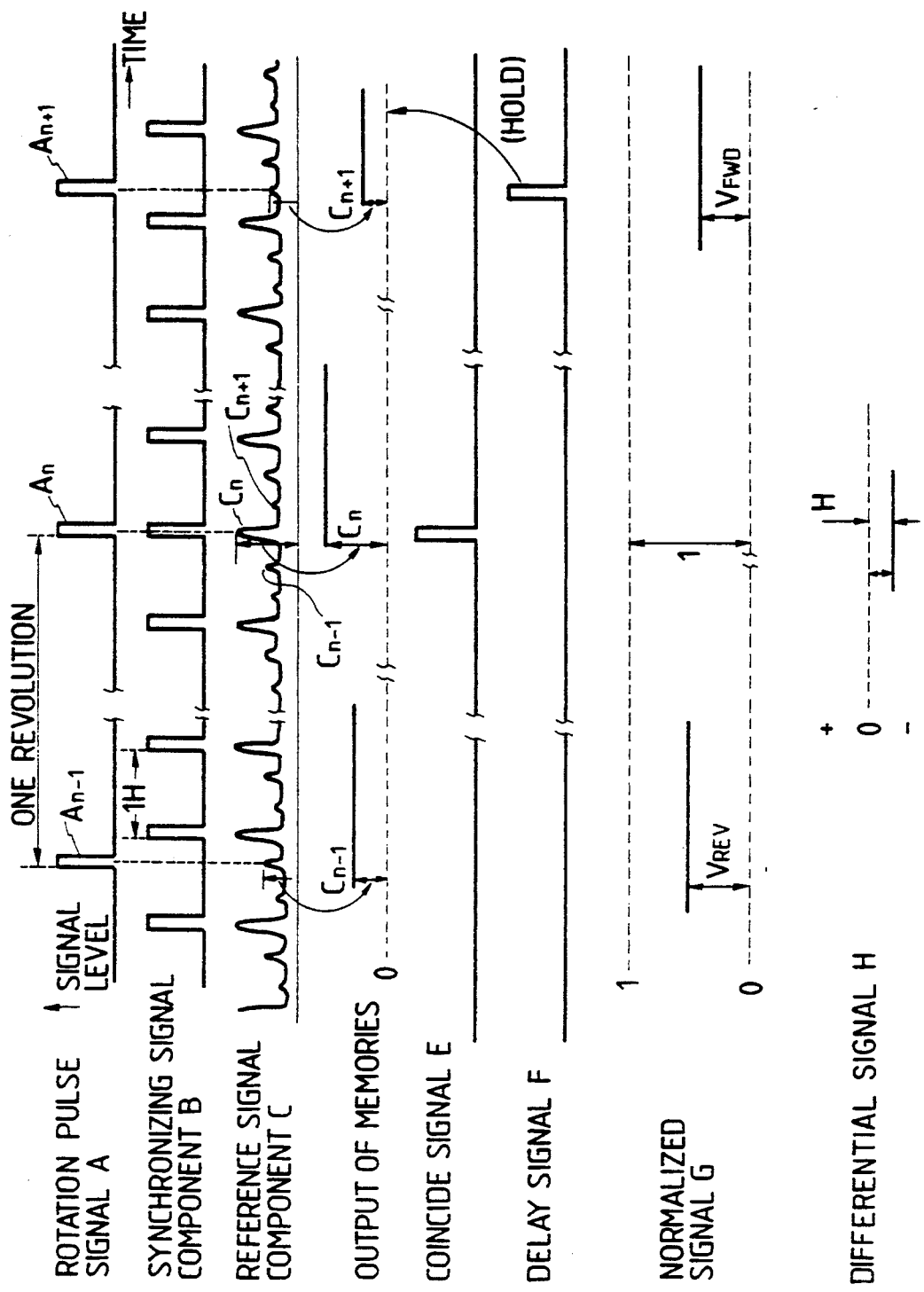

DEVICE FOR DETECTING CROSS TALK LEVEL OF OPTICALLY READ SIGNAL

This is continuation of application Ser. No. 07/513,738, filed Apr. 24, 1990, now abandoned.

BACKGROUND OF THE INVENTION

The present invention relates to an information reproducing apparatus for reproducing information stored in a recording medium (e.g., an optical disk) which has an information storage track, and more particularly to a device for detecting the crosstalk level of a signal which is optically read from the recording medium.

Optical disks such as laser vision disks or the like have information storage tracks for recording information in the form of signal pits arranged as spiral turns extending progressively from the inner circumferential edge toward the outer circumferential edge of the optical disks. The optical disks with such information storage tracks, however, suffer the problem of crosstalk in which a signal read from a track which is being presently traced or read is affected by information recorded in an adjacent track. One of the causes of the crosstalk problem is that a laser beam spot applied to the optical disk is so large as compared with the distance between two adjacent tracks that when the laser beam spot is falling on one track, it is also applied to an adjacent track. Therefore, the laser beam also reads the information recorded in the adjacent track as well as the recorded information from the track which is being presently traced.

There are known two solutions to the crosstalk problem of the information read from optical disks. According to one of the solutions, any inclination of an optical disk being read with respect to an optical pickup is detected, and the optical pickup is corrected in its attitude so that it correctly faces the information recording surface of the optical disk. More specifically, light emitted from a light source such as a light-emitting diode or the like is applied to the optical disk, and light reflected from the optical disk is detected by two photodetectors which are positioned on each side of the light source. The levels of output signals from the photodetectors are compared with each other by a differential amplifier to detect any inclination of the optical disk. Depending on the detected disk angle, the light source and the photodetectors are positionally corrected into correctly facing relationship to the optical disk through a feedback loop. However, this arrangement has certain drawbacks. The pickup is necessarily large in size. At an outer circumferential region of the optical disk, a portion of the light emitted from the light source may not be applied to the optical disk, and hence the photodetectors may not produce output signals of proper values.

According to the other solution, three adjacent tracks on an optical disk are simultaneously read, and the detected signals are subjected to a subtraction process. One typical correcting process is disclosed in Japanese Laid-Open Patent Publication No. 57-5824. In the disclosed process, three adjacent tracks are simultaneously read, and the read signal values are subtracted to remove the crosstalk effect. With this process, however, the pickup is complex in structure. Since the signals read from the adjacent tracks also contain crosstalk from the next tracks adjacent to the adjacent tracks, the recording density of the optical disk used with this process should be limited in the range of making such crosstalk negligible.

SUMMARY OF THE INVENTION

It is an object of the present invention to provide a crosstalk detector which requires no new detecting mechanism, but processes a signal read from an optical disk to accurately detect the level of crosstalk contained in the read signal.

According to the present invention, there is provided a device for detecting the level of crosstalk of a signal which is read from an information storage medium having a plurality of signal tracks with periodic signals recorded therein at positions out of alignment with each other in a direction normal to a track (on a normal line of a track), while the signal tracks are being traced, the device comprising means for comparing the levels of reference signal components contained in the read signal and produced from adjacent signal tracks at positions on the same normal line of the tracks, thereby determining the level of crosstalk of the read signal.

The tracks of the information storage medium are successively traced by an optical pickup, which optically reads recorded information as a signal. A periodic reference signal is extracted from the read signal. The periodic reference signal contains reference signal components from the adjacent tracks at the aligned positions on the information storage medium. The levels of the extracted reference signal components are compared by a processing means to detect levels of information leaked into the read signal of one track from adjacent tracks.

Since the levels of crosstalk are detected employing the periodic reference signal (such as a horizontal synchronizing signal) contained in the recorded information, no special mechanism for detecting the inclination of the information storage medium is required.

The above and other objects, features and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIG. 4 is a diagram of signal waveforms produced in the crosstalk level detector shown in FIG. 3.

DETAILED DESCRIPTION OF THE INVENTION

Prior to describing the present invention, a conventional disk inclination detector will first be described with reference to FIGS. 1 and 2.

Figure 1:
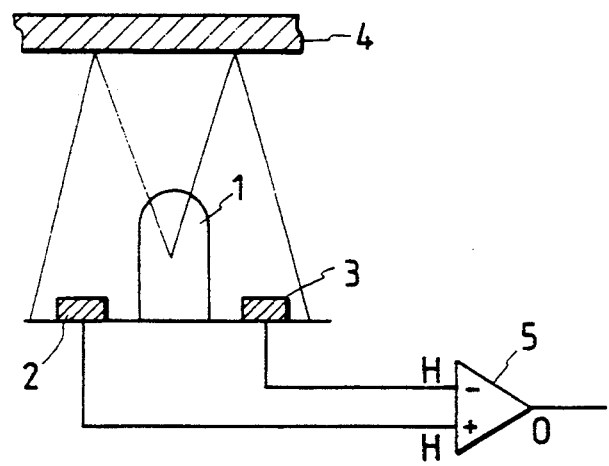
FIGS. 1 and 2 are schematic views showing a conventional disk inclination detector.
Figure 2:
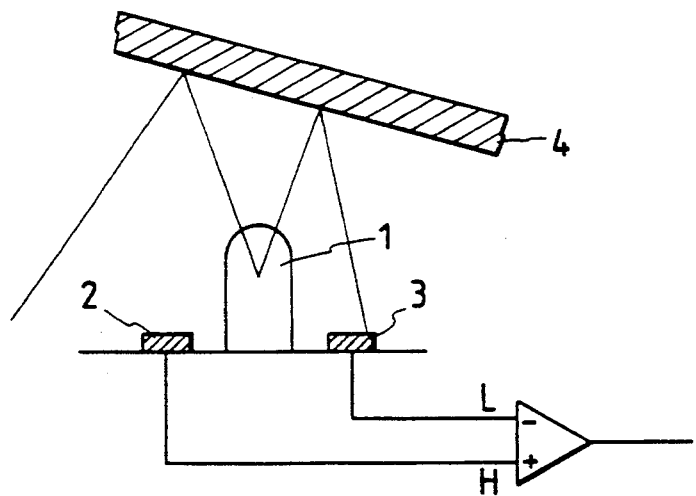

The disk inclination detector shown in FIGS. 1 and 2 serves to effect the first process for solving the crosstalk problem, as described in the description of the prior art above. As shown in FIGS. 1 and 2, a light emitted from a light source 1 such as a light-emitting diode or the like is applied to an optical disk 4, and light reflected from the optical disk is detected by two photodetectors 2, 3 which are positioned on each side of the light source 1. The levels of output signals from the photodetectors 2, 3 are compared with each other by a differential amplifier 5 to detect any inclination of the optical disk 4.

Depending on the detected disk angle, the light source 1 and the photodetectors 2, 3 are positionally corrected into correctly facing relationship to the optical disk 4 through a feedback loop.

As shown in FIG. 1, while the light source 1 and the photodetectors 2, 3 are correctly facing the optical disk 4, the intensities of light which are detected by the respective photodetectors 2, 3 are equal to each other, and hence the differential amplifier 5 produces no output. When the optical disk 4 is inclined as shown in FIG. 2, the intensity of light detected by the photodetector 2 is greater than the intensity of light detected by the photodetector 3. Therefore, the differential amplifier 5 produces a positive output signal, thereby detecting the inclination of the optical disk 4.

Figure 3:
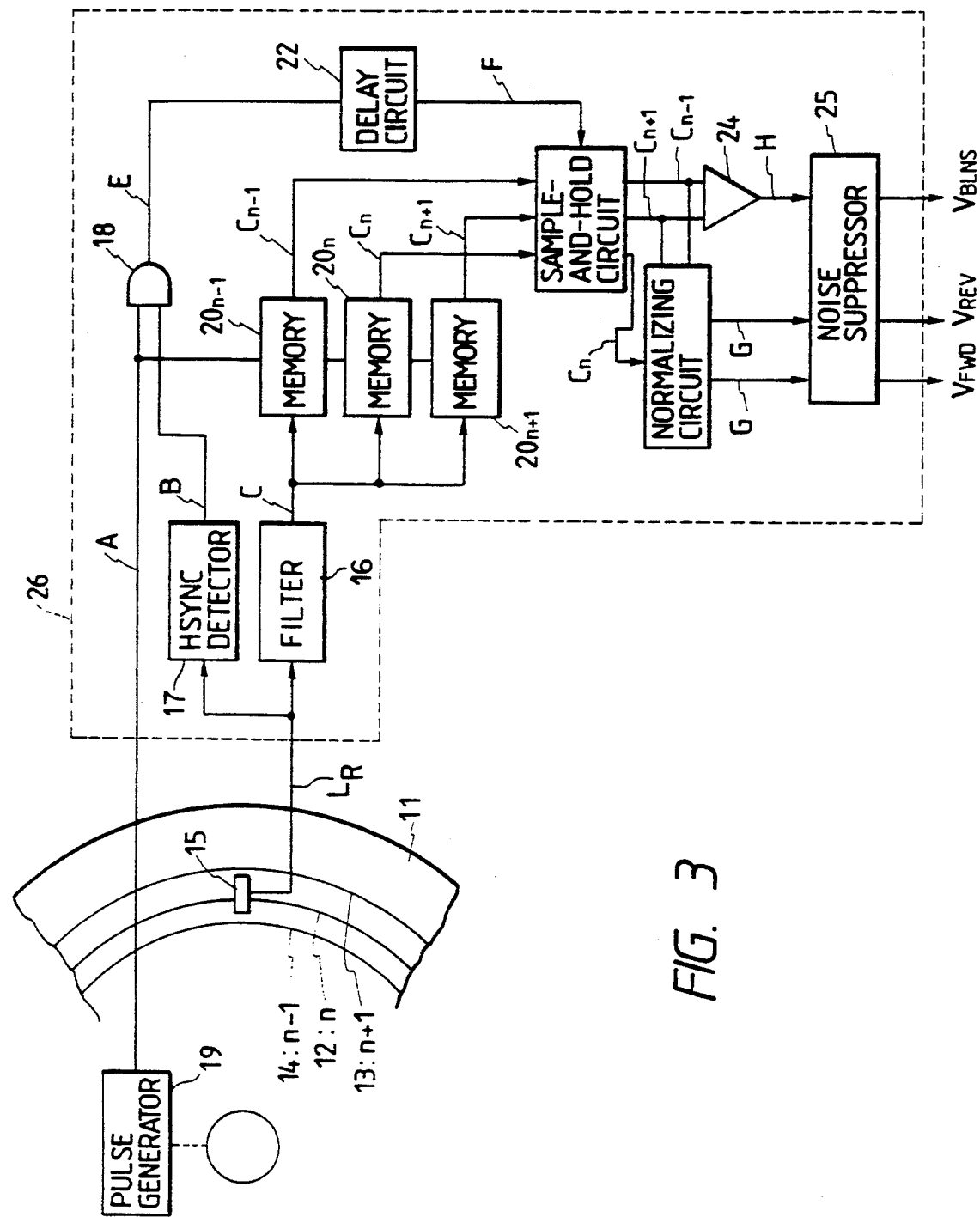
FIG. 3 is a block diagram of a crosstalk level detector according to the present invention.

FIG. 3 shows a crosstalk level detector according to the present invention. In the illustrated embodiment, the crosstalk detector is employed in association with an optical disk used as a recording medium having information storage tracks.

An optical disk 11 has a plurality of spiral tracks in which various items (signals) of information are recorded. It is assumed for the purpose of illustration that a track which is being presently traced is an nth track 12, a track which was previously traced (i.e., an inner track) is an (n−1)th track 14, and a track which will subsequently be traced (i.e., an outer track) is an (n+1)th track 13. A reference signal which appears periodically repeatedly, i.e., a horizontal synchronizing signal Hsync, and other information such as a video signal, are recorded in each of these tracks 12, 13, 14. Generally, since the optical disk 11 is therefore of a CLV (Constant Linear Velocity) form or a CAA (Constant Angular Acceleration) form, the reference signals Hsync in the nth track 12, the (n+1)th track 13, and the (n−1)th track 14 are not recorded in the same circumferential positions, but are recorded in positions which are not radially aligned between adjacent tracks, i.e., are circumferentially staggered from track to track. If the recorded signal is a National Television System Committee (NTSC) standard television signal, the reference signal Hsync has a frequency of 15,734.265 Hz, and is frequency-modulated by a carrier frequency of 7.6 MHz.

The crosstalk level detector, generally denoted at 26, detects and issues a first crosstalk level $V_{rev}$ a second crosstalk level $V_{FWD}$ and a crosstalk balance level $V_{BLNS}$ based on a read signal $L_R$ which is produced by an optical pickup 15 that traces one track at a time, and a pulse signal A generated by a pulse generator 19 associated with a mechanism for rotating the optical disk 11. The pulse generator 19 produces one pulse each time the optical disk 11 makes one revolution, for example.

The crosstalk level detector 26 has an Hsync detector 17 and a filter 16 to which an output signal of the optical pickup 15 is applied. The Hsync detector 17 detects a signal component (the horizontal synchronizing signal Hsync) B contained in the read signal $L_R$ from the optical pickup 15. The filter 16 extracts a signal component (reference signal component) C contained in the read $L_R$ and having the same frequency as that of the synchronizing signal component. That is, the filter 16 extracts the horizontal synchronizing signal of the track being presently traced and the crosstalks of the horizontal synchronizing signals of the two tracks adjacent to the traced track. The filter 16 has its output terminal connected to memories 20n−1, 20n, 20n+1. The pulse signal A from the pulse generator 19 and the synchronizing signal component B from the Hsync detector are applied to a coincidence detector 18 which detects the time when the pulse signal A and the synchronizing signal component B coincide with each other. The memories 20n−1, 20n, 20n+1, when triggered by the pulse signal A, store reference signal components Cn−1, Cn, Cn+1, respectively, which are produced successively from the respective tracks each time the optical disk 11 makes one revolution. The coincidence detector 18 applies a coincidence signal E to a delay circuit 22 which delays the signal E by the time that is required for the optical disk 11 to make one revolution. The delay circuit 22 applies its delayed output signal F to a sample-and-hold circuit 21. When triggered by the delayed signal F, the sample-and-hold circuit 21 samples and holds the reference signal components Cn−1, Cn, Cn+1 which are stored in the respective memories 20n − 1, 20n, 20 + 1. The sample-and-hold circuit 21 have output terminals connected to a normalizing circuit 23 and a differential amplifier 24. The differential amplifier 24 compares the reference signal components Cn−1, Cn+1 from the sample-and-hold circuit 21, and issues a differential signal H (=Cn−1—Cn+1) representative of the difference between the reference signal components Cn−1, Cn+1. The normalizing circuit 23 normalizes the levels of the reference signal components Cn−1, Cn+1 with reference to the reference signal component Cn which is assumed to be of a level "1". The normalizing circuit 23 and the differential amplifier 24 have output terminals coupled to a noise suppressor 25. The noise suppressor 25 removes noise contained in the differential signal H produced by the differential amplifier 24 and crosstalk level signals G produced by the normalizing circuit 23.

Operation of the crosstalk level detector 26 shown in FIG. 3 will be described below with reference to FIG. 4.

When the optical disk 11 rotates, the pulse generator 19 produces a pulse signal A which contains one pulse each time the optical disk 11 makes one revolution. At this time, the optical pickup 15 traces the tracks successively from inner toward outer circumferential edges of the optical disk 11, i.e., from the (n−1)th track 14 toward the (n+1)th track 13. As the optical pickup 15 successively traces tile tracks, it produces a read signal $L_R$ containing a synchronizing signal Hsync which is detected by the Hsync detector 17 which produces a synchronizing signal component B as its output signal. The synchronizing signal component B is composed of a train of pulses which appear once in each horizontal period 1H (FIG. 4). The read signal $L_R$ is also applied to the filter 16. The filter 16 extracts a signal having the same frequency as that of the synchronizing signal Hsync, and issues the extracted signal as a reference signal component C. As shown in FIG. 4, the reference signal component C contains a reference signal component Cn from the nth track 12 which is being presently traced, and also reference signal components Cn−1, Cn+1 from the adjacent (n−1)th and (n+1)th tracks 14, 13. The latter reference signal components Cn−1, Cn+1 are crosstalk components with respect to the former reference signal component Cn.

When the optical pickup 15 traces the (n−1)th track 14, the memory 20n−1 is triggered by a pulse An−1 of the pulse signal A which is produced at this time, thereby storing the crosstalk component Cn−1 contained in the reference signal component C.

Then, the optical disk 11 makes one revolution, and the optical pickup 15 traces the nth track 12. At this time, a pulse An of the pulse signal A is produced in timed relation to the synchronizing signal component B. The pulse An triggers the memory 20n which stores the reference signal component Cn. The pulse signal A and the synchronizing signal component B, which are synchronizing at this time, are gated by the coincidence detector 18, which now produces a coincidence signal E. The coincidence signal E is delayed by the delay circuit 22 by a period of time corresponding to the time required for the optical disk 11 to make one revolution. The delayed coincidence signal is then issued as a delay signal F from the delay circuit 22 and applied to the sample-and -hold circuit 21. The coincidence signal E is delayed by the time corresponding to one revolution of the optical disk 11 because it is necessary to wait for the arrival of the reference signal component Cn+1 from the (n+1)th track 13 in order to carry out a processing operation, described later on.

The optical disk 11 makes another revolution, and a pulse An+1 of the pulse signal A is produced when the optical pickup 15 traces the (n+1)th track 13. The pulse An+1 triggers the memory 20n+1 to store the crosstalk component Cn+1 contained in the reference signal component C at this time.

In this manner, when the pulses of the pulse signal A are successively produced (i.e., when the optical disk 11 makes successive revolutions), the reference signal components Cn−1, Cn, Cn+1 are stored respectively in the memories 20n−1, 20n, 20n+1. These stored data Cn−1, Cn, Cn+1 are then sampled and held in the sample-and-hold circuit 21 until the delayed signal F is applied to the sample-and-hold circuit 21 (i.e., until the reference signal component Cn+1 is stored). The stored data Cn−1, Cn, Cn+1 are sampled and held in the sample-and-hold circuit 21 for the reason that these values should be kept to allow the processing operation to continue even if the reference signal component C varies faster than the processing operation.

The stored reference signal components Cn−1, Cn, Cn+1 correspond respectively to the reference signals Hsync stored in the (n−1)th track 14, the nth track 12, and the (n+1)th track 13. Therefore, the level of crosstalk contained in the read signal $L_R$ from the presently traced track can be determined when the levels of the reference signals Hsync which are leaked from the adjacent tracks are detected. More specifically, time reference signal components Cn−1, Cn, Cn+1 from the sample-and-hold circuit 21 are fed to the normalizing circuit 23 in which the reference signal or crosstalk components Cn−1, Cn+1 are normalized or adjusted to values with respect to the reference signal component Cn which is used as a reference level. The level of crosstalk from the (n+1)th track 13 is indicated by a normalized signal G which is produced as a first crosstalk level $V_{REV}$ from the normalizing circuit 23. The level of crosstalk from the (n−1)th track 14 is indicated by another normalized signal G which is produced as a second crosstalk level $V_{FWD}$ from the normalizing circuit 23. These crosstalk components can be removed when the first and second crosstalk levels $V_{REV}$, $V_{FWD}$ are subtracted from the read signal $L_R$ from the presently traced track.

The reference signal components Cn−1, Cn+1 are also applied to the differential amplifier 24 which compares these reference signal components Cn−1, Cn+1 and produces a differential signal H representing the difference therebetween. The differential signal H indicates the ratio between the crosstalk levels from the (n−1)th and (n+1)th tracks, i.e., the balance between the crosstalk levels from these tracks, or a crosstalk balance level $V_{BLNS}$. Stated otherwise, the differential signal H represents a quantity relative to the degree to which the optical disc 11 may be inclined. Therefore, the differential signal H can be used as a feedback signal to incline the optical pickup 15 in the same direction as the optical disk 11 until the optical pickup 15 faces the optical disk 11 correctly.

Depending on the track being traced by the optical pickup 15, the crosstalk components Cn−1, Cn+1 from the filter 16 may be synchronized with the synchronizing signal Hsync. Alternatively, the reference signal component C may be increased in level by extraneous noise. When this happens, no signal level difference becomes appreciable, and any crosstalk cannot be determined accurately. Such crosstalk component synchronizing or noise can be removed by an arithmetic mean of small signal levels produced from several tracks. The noise suppressor 25 is employed to effect such noise removal.

In the above embodiment, the optical disk 11 has been described as an information storage medium. However, any of various other information storage mediums may be employed in the present invention insofar as they have information storage tracks which contain periodic reference signals which are not aligned in a direction (e.g., a radial direction) normal to the tracks. Examples of such information storage mediums are an optical card, a magnetic disk having information storage tracks and the like.

The pulse generator 19 shown in FIG. 3 generates one pulse of the pulse signal A each time the optical disk 11 makes one revolution for the storage of signals read from the tracks at the same position. However, pulses at any time intervals may be employed provided that one or more pulses are generated in each revolution of the optical disk 11 and processing circuits corresponding to the number of pulses per revolution are provided in such a case. The pulses of the pulse signal A are not limited to a certain duration (width), but may be of any of various durations.

The sample-and-hold circuit 21 holds the reference signal components Cn−1, Cn, Cn+1 for a certain period of time for the reason that the data stored in the memories 20n−1, 20n, 20n+1 may vary during a processing operation. If necessary, the circuit arrangement may be modified to stop the writing of the data into the memories 20n−1, 20n, 20n+1 in a processing operation, thus making the crosstalk level detector 26 simpler. If the normalizing circuit 23 and the differential amplifier 24 may be arranged for a faster processing operation, then the sample-and-hold circuit 21 may be dispensed with.

The invention may be embodied in other specific forms without departing from the spirit or essential characteristics thereof. The present embodiment is therefore to be considered in all aspects as illustrative and not restrictive, the scope of the invention being indicated by the appended claims rather than by the foregoing description and all changes which come within the meaning and range of equivalency of the claims are therefore intended to be embraced therein.

What is claimed is:

1. A device for detecting a level of crosstalk of a signal which is read from an information storage medium being traced during reproduction thereof, said storage medium having a plurality of signal tracks with periodic signals recorded therein as positions out of alignment with each other in a radial direction of the tracks, each of said periodic signals containing at least one reference signal component, said device comprising:

receiving means for receiving a read signal from the information storage medium when one of said plurality of signal tracks is being traced; and comparing means for comparing levels of reference signal components contained in said read signal with levels of reference signal components produced from adjacent signal tracks at positioned aligned in said radial direction, thereby determining the level of crosstalk of said read signal, wherein said comparing means comprises:

reference signal extracting means for extracting, at least, a reference signal component contained in the read signal from said one signal track being traced, and a reference signal component contained in a read signal from an adjacent track positioned adjacent to the track being traced when said adjacent track is traced, in timed relation to periodic rotation of the information storage medium; and processing means for comparing the level of the reference signal component from said one signal track being traced and the level of the reference signal component from the adjacent track, thereby determining the level of crosstalk of said read signal, wherein said reference signal extracting means comprises:

filter means for passing only reference signal components contained in said read signal; and memory means for storing each of the reference signal components components from their respective tracks, having passed through said filter means, in timed relation to periodic rotation of the information storage medium.

2. A device according to claim 1, wherein said information storage medium comprises an optical disk, said at least one reference signal component comprising a horizontal synchronizing signal contained in information recorded in said optical disk.

3. A device according to claim 1, wherein said processing means further comprises a means for normalizing the level of crosstalk from each of said adjacent tracks, according to the level of the track being traced.

4. A device for detecting a level of crosstalk of a signal which is read from an information storage medium being traced during reproduction thereof, said storage medium having a plurality of signal tracks with periodic signal recorded therein at positions out of alignment with each other in a radial direction of the tracks, each of said periodic signals containing at least one reference signal component, said device comprising:

receiving means for receiving a read signal from the information storage medium when one of said plurality of signal tracks is being traced; and comparing means for comparing levels of reference components produced from adjacent signal tracks at positions aligned in said radial direction, thereby determining the level of crosstalk from radially inner and radially outer tracks, said comparing means comprising reference signal extracting means for extracting and storing the reference signal components contained in the read signals from the tracks located inwardly and outwardly, respectively, of the track being traced, in timed relation to periodic rotation of the information storage medium; and inclination detecting means for detecting an inclination of the information storage medium based on the levels of crosstalk from the adjacent signal tracks, said inclination detecting means comprising processing means for comparing the levels of crosstalk from the radially inner track and from the radially outer track, and producing a differential signal indicative of the inclination of the information storage medium.

5. A device according to claim 4, wherein said inclination detecting means further comprises a means for normalizing the level of crosstalk from each of said adjacent tracks, according to the level of the track being traced.

6. A device according to claim 4, wherein said inclination detecting means further comprises a means for suppressing noise in the differential inclination signal.

7. A method of detecting a level of crosstalk of a read signal that is read from an information storage medium, said signal including a reference signal component and a synch signal component, both of which are associated with a respective one of a plurality of tracks on the storage medium, the method comprising the steps of:

receiving a read signal from a first track of the storage medium, and storing a first reference signal component associated with said first track;

receiving a read signal from a second track of the storage medium, storing a second reference signal component associated with said second track, and generating a coincidence signal pulse in response to the coincidence of a rotation signal pulse, which is generated each time the medium makes one revolution, and a synch signal component associated with said second track;

delaying said coincidence signal for a period equal to a period of one revolution of the medium;

receiving a read signal from a third track of the storage medium, storing a third reference signal component associated with said third track, sampling and holding each of said first, second and third reference signal components in response to said coincidence signal pulse having been delayed in said delaying step;

normalizing said first and third reference signal components with respect to said second reference signal component, and producing normalized signals representative thereof;

wherein said normalized signals represent crosstalk signal components contained in said read signal during reading of said second track.

8. The method of detecting the level of crosstalk as recited in claim 7 further comprising the step of subtracting said normalized signals when said second track is being read so that the respective read signal can be produced without crosstalk from said first and third tracks.

9. The method of detecting the level of crosstalk as recited in claim 8 further comprising the step of producing a difference signal based on a difference between said first and third reference signal components, said difference signal being used as a feedback signal to incline an optical pickup in accordance with an incline of the medium.

10. A method according to claim 7, further comprising the step of suppressing noise in the normalized crosstalk signals.

* * * * *